Patented May 19, 1936

2,040,871

UNITED STATES PATENT OFFICE 2,040,871

PROCESS OF DRYING TOBACCO FOR INSECTICIDAL PURPOSES

Robert Graham Mewborne, Albuquerque, N. Mex., assignor to Niagara Sprayer and Chemical Co., Inc., Middleport, N. Y., a corporation of New York No Drawing. Application October 8, 1929, Serial No. 398,273. Renewed January 26, 1934

10 Claims. (Cl. 167—34)

This invention relates to a process for treating tobacco; more particularly, a process of heat treating tobacco to conserve the toxic ingredients.

In my joint application, S. N. 206,376, I have described a method of heat treating tobacco to prevent losses of the toxic component, such as nicotine, preliminarily to preparing products useful for insecticidal purposes whereby the toxic component, such as nicotine, may be conserved and economy effected in the raw material in which the toxic components are contained. It is contemplated by me to utilize tobacco material which has been grown to the point where it contains the optimum nicotine content and accompanying toxic constituents and utilize this product for its valuable nicotine content and its accompanying toxic ingredient for insecticidal purposes, preferably using it in the form of a pulverulent or powdered dust or the like product. As indicated in my prior application, certain losses are encountered between the time the tobacco is harvested and this raw product is processed into a more permanent form as a dust or a composition including mineral matter or for further processing to obtain the nicotine content. Such losses may be due to translocation of the nicotine or toxic ingredient, bacterial decomposition, enzymitic activity or the like. It is contemplated by my joint application to prevent these losses by heating the tobacco material, preferably at the time it has the optimum nicotine or accompanying toxic constituent and thereby remove the water content and prevent the activity tending to destroy and decompose the desirable nicotine and its accompanying toxic constituent. Briefly the process described is to immediately dehydrate the tobacco plant and reduce the moisture content to less than 15%, preferably to about 5%, by heating the plant from 60° to 100° C. for a period of from 1 to 3 hours.

I have discovered that the nicotine and toxic component is developed in the plant in different degrees in the various portions thereof, constituting the roots, stalk, stems and leaves and that the time and temperature factors to remove the moisture content to support metabolism, bacterial decomposition or enzymitic activity, diffusion or osmotic dissemination of the toxic nicotine content or the ingredients accompanying the same is not the same for these different portions of the plant and that if the portions of the plant of the finer texture, such as the leaf and even parts of the leaf and the stem, are maintained in the heating zone until the necessary water has been abstracted from the thicker parts of the leaf and the stems, stalks or roots, that there will result a substantial loss of the nicotine content by volatilization of the nicotine or the toxic component accompanying the same.

It is therefore an object of my invention to heat tobacco material and dehydrate the water content to remove the medium tending to support translocation, metabolism, bacterial decomposition, enzymitic activity, diffusion or osmotic dissemination and avoid the losses of the nicotine content resulting from this treatment by removing the product under treatment from the heating zone and from other portions of the plant in accordance with the texture of the plant.

In accordance with my invention, the tobacco plant, including the roots, stalk, stems and leaves, is grown to the optimum point for retaining the nicotine component and the accompanying toxic ingredient, a complex compound which at present has not been isolated. It is preferred that the tobacco is harvested while still green and at the stage of growth where it has been determined that the maximum nicotine content is in the leaves of the plant, as distinguished from the stems, stalks and roots. This is preferred, but is not necessary, as will be obvious as this description proceeds.

The tobacco plant thus obtained may be immediately dried, although in some instances it may be necessary to use plants which have been subjected to sun drying or air drying, by suspending the plant on a belt which traverses through a heating drum, maintained at a temperature of from 60–100° C. The belt supporting the plant is of a wide open mesh. The plant, carried on the belt, moves slowly through the heating drum and is subjected to a beating process. As a result of this beating process, the fragile or more quickly dried portions of the plant, as soon as they have their moisture content reduced to the point where nicotine is volatilized in a substantial quantity, are readily separated from the stems. As this point may vary with the particular plants, depending upon the locality in which the tobacco is grown, the species of tobacco plant and the condition of the tobacco used, its texture and moisture content, it is preferred to to determine from a sample batch just at what condition of reduced moisture content the nicotine begins to volatilize in objectionable quantities. Conditions of texture of the plant, water content and gummy materials, as well as the constitution of the plant have an influence on the combined vapor pressure of the moisture, the nicotine and the accompanying toxic component and accordingly the moisture content is not reduced to a definite percentage. For the purposes indicated, the moisture content is reduced to 25% or less, to a percentage, in some instances as low as 5% or less. Ordinarily, further subjection of the plant so separated to heat is unnecessary as the moisture content has been sufficiently reduced to prevent decomposition of the toxic component, such as nicotine and the ingredient accompanying the same. Should further heat be necessary, the operation is completed in vacuo, or below atmospheric pressures, to abstract moisture without substantial loss of nicotine. Further heat treatment will volatilize the nicotine component. I therefore contemplate removing from the heating zone the tobacco material so separated from the plant or which has been heated to that point where further heating will merely cause substantial loss of the nicotine.

The remainder of the plant, including rougher textured leaves, stems, stalks and roots may be progressively heated within the temperature range to the point in accordance with the texture of the remaining leaves, stems, stalks and roots where empirically it has been determined further heat will cause a substantial volatilization of the nicotine. I have found that a fairly good test for discontinuing the heating of the plant is when the blow of the beater will shatter the finer textured portions of the plant from the rougher or coarser portions of the plant. When so shattered, if removed from the heating zone, they will retain the maximum nicotine content in a condition resistant to decomposition by agencies previously described and without loss of the nicotine due to volatilization by reason of the heat treatment.

After removing the portions of the plant so dried and this will include the finer textured portions, such as the leaf, the remainder of the plant, such as the stems, stalks and roots, is heated for a further period of time to dehydrate the various portions and remove the moisture content without volatilization of the nicotine content, to an extent indicated in my prior joint application as set forth above, to wit, 60 to 100° C., which state of dehydration is desired to prevent decomposition of the toxic component.

It will be observed that though I have noted, in accordance with the apparatus used, that the beating will remove the finer textured portions of the plant, such as the leaf, at the early stages of the operation, the outer skin or shell of the stems or stalks may be sufficiently dehydrated to be readily removed by the beating or agitating process and as these portions of the plant have been reduced to a lower moisture content, sufficient to be thus readily removed, they are also removed from the heating zone to avoid the additional heat which will cause a loss of the nicotine component.

It will thus be observed that though I have described the preferable process of removing the finer textured portions of the plant as they are dehydrated, by a shattering process, a grinding action tending to remove the more frangible parts as a result of dehydration may be carried out by a superficial grinding action to an extent where the resinous or gummy material will not be brought to the surface but will be merely sufficient to separate the dehydrated material, either that constituting the finer textured material, such as the leaf, or the superficial portions of the stems, stalks and roots.

It will be further observed that though my preferable temperature is from 60–100° C., this range of temperature is particularly preferred when the finer textures of the plant are still associated with the entire plant and this plant contains the maximum amount of nicotine, but as the finer textures of the plant are removed or have been dehydrated sufficiently so that further heating will result in the volatilization or loss of nicotine, the coarser portions of the plant, such as the stems, stalks and roots may be heated to a higher temperature, such as 250° C. For certain purposes, also, the higher range, above 100° C., may be utilized for a very short period of time if the finer textured portions are immediately removed from the zone of heating. This I have found may be accomplished by grinding or striking the plant so that the more frangible portions, due to dehydration, will be separated, and though I have described a period of time of from 1–3 hours, within a temperature range of 60–100° C. as accomplishing the desired results, a shorter period of time than 1 to 3 hours at the higher temperatures, will accomplish equivalent results to dehydrate the plant sufficiently to prevent the losses due to enzymitic or bacterial activity or as otherwise previously referred to, and at the same time avoid losses due to volatilization of the nicotine component or the toxic volatile ingredient accompanying the same.

Though I have described my process as preferably applicable to the tobacco plant which has been harvested and treated when containing the optimum nicotine content, the process described is also applicable for treatment of tobacco material, no matter from what source, and containing nicotine. This may include waste tobacco material, stems, stalks and the like.

Having thus described my invention and illustrated its use, what I claim as new and desire to secure by Letters Patent, is—

1. The process of drying tobacco material including a nicotine content for the purposes described which comprises heating tobacco material, including the stems and leaves, to dehydrate the same and removing the finer textured portions of the plant portions treated as volatilization of the nicotine component begins, to a cooler zone.

2. The process of drying tobacco material comprising the entire plant and including a nicotine content for the purposes described which comprises bringing the tobacco material within a heating zone to progressively dehydrate it and progressively removing the dehydrated portions, as substantial volatilization of the nicotine content begins, by shattering the dehydrated portions, from the main body of the plant to remove them to a cooler zone.

3. The process of drying tobacco material including substantially the entire plant which includes a nicotine content for purposes described which comprises dehydrating substantial portions of the tobacco plant and reducing the moisture content to less than 25% and progressively removing from the main body thereof, portions of the plant of reduced content as the moisture content of such portions reaches 25% or less whereby such portions may be moved to a cooler zone.

4. The process of drying tobacco material including nicotine content for the purposes described which comprises treating substantially the entire plant by exposing the same to a source of heat until portions thereof become frangible by dehydration of the moisture content and until volatilization of nicotine begins and removing the portions first to become frangible from the remainder of the plant and from the source of heat, continuing the heating of the remainder of the plant and progressively and continuously removing the more frangible portions from the remainder of the plant whereby substantial loss of nicotine will be avoided and leaving other portions of the tobacco under the action of the source of heat.

5. The process of drying tobacco including a nicotine content for the purposes of retaining the maximum nicotine content therein, which comprises heating tobacco material within a zone and dehydrating the same progressively, and removing portions of the tobacco material progressively as dehydrated from other portions of the tobacco and from the heating zone conducting the same to a cooler zone as the portions heated are dehydrated to the point where further heat treatment will cause a loss of nicotine by volatilization to thereby retard the volatilization of nicotine of the portions removed.

6. The process of drying the entire tobacco plant including a quantity of nicotine therein for the purposes of preserving the maximum nicotine content therein, which comprises heating the tobacco plant within a heated zone until portions thereof are sufficiently dehydrated to become frangible and shattering from the tobacco plant such dehydrated portions and removing the portions so shattered from the heating zone to a cooler zone and continuing the heating of the other portions progressively in the heated zone until the maximum amount of moisture is removed therefrom without causing substantial loss of nicotine.

7. The process of drying tobacco material including a nicotine content for the purposes of preserving the nicotine content therein comprising dehydrating tobacco material within a heating zone until portions thereof become frangible, subjecting the tobacco material to shattering blows and removing the tobacco responding to the shattering blows from the heating zone to a cooler zone in which volatilization of nicotine is retarded.

8. The process of preparing dry tobacco material for the purposes of preserving the maximum nicotine content therein which comprises treating substantially the entire plant by exposing the same to the source of heat until portions thereof become frangible by dehydration and other portions thereof remain infrangible and removing the portions first to become frangible from the remainder of the plant and from the source of heat, continuing the heating of the remainder of the plant and progressively removing the more frangible portions as they are reduced to such condition from the remainder of the plant by dehydration whereby such portions may be removed to a non-dehydrated zone for retarding the volatilization of the nicotine content.

9. The process of drying tobacco, which comprises dehydrating the entire green tobacco plant at optimum nicotine content by passing the plant through a zone heated to a temperature high enough to drive off the moisture from the plant, but insufficient to materially volatilize the nicotine, subjecting the plant while in the heating zone to shattering blows, so as to remove the finer texture portions of the tobacco plant from the main body thereof, removing the shattered portions of the plant immediately from the heating zone, continuing the heating of the remainder of the plant to dehydrate the same, and progressively removing the more frangible portions from the remainder of the plant from the heating zone, whereby substantial loss of the nicotine will be avoided.

10. The process of drying tobacco, which comprises feeding substantially the entire plant, including substantially its entire nicotine content, into a heating zone maintained at a temperature of from 60 to 100° C., dehydrating the tobacco material so heated, and progressively removing the dehydrated portions of the plant, as volatilization of the nicotine content begins, by separating the portions so dehydrated from the main body of the plant and the heating zone.

ROBERT GRAHAM MEWBORNE.